(12) United States Patent
Gan et al.

(10) Patent No.: US 12,464,384 B2
(45) Date of Patent: Nov. 4, 2025

(54) METHODS AND APPARATUSES FOR CONFIGURATION OF MONITORING FOR TERMINAL DEVICE

(71) Applicant: Telefonaktiebolaget LM Ericsson (publ), Stockholm (SE)

(72) Inventors: Juying Gan, Shanghai (CN); Wenliang Xu, Shanghai (CN); Emiliano Merino Vazquez, Madrid (ES); Mikael Wass, Sätila (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 483 days.

(21) Appl. No.: 17/604,787

(22) PCT Filed: Apr. 29, 2020

(86) PCT No.: PCT/CN2020/087786
§ 371 (c)(1),
(2) Date: Oct. 19, 2021

(87) PCT Pub. No.: WO2020/221297
PCT Pub. Date: Nov. 5, 2020

(65) Prior Publication Data
US 2022/0210677 A1 Jun. 30, 2022

(30) Foreign Application Priority Data
Apr. 30, 2019 (WO) ............... PCT/CN2019/085329

(51) Int. Cl.
*H04L 12/24* (2006.01)
*H04W 8/04* (2009.01)
(Continued)

(52) U.S. Cl.
CPC ............ *H04W 24/08* (2013.01); *H04W 8/04* (2013.01); *H04W 48/16* (2013.01); *H04W 60/02* (2013.01)

(58) Field of Classification Search
None
See application file for complete search history.

(56) References Cited

U.S. PATENT DOCUMENTS 9,930,516 B2 * 3/2018 Won ...................... H04W 24/10
10,555,160 B2 * 2/2020 Ryu ........................ H04W 8/02
(Continued)

FOREIGN PATENT DOCUMENTS

| CN | 102075900 A | 5/2011 |
| CN | 102421080 A | 4/2012 |

(Continued)

OTHER PUBLICATIONS

"Discussion on multiple monitoring event configurations support", SA WG2 Meeting #133, S2-1905511, (Revision of S2-19xxxxx), Huawei, HiSilicon, Reno, NV, USA, May 13-17, 2019, 3 pages.
(Continued)

*Primary Examiner* — Sithu Ko
(74) *Attorney, Agent, or Firm* — Murphy, Bilak & Homiller, PLLC

(57) ABSTRACT

Methods and apparatuses for configuration of monitoring for terminal device are disclosed. According to an embodiment, a subscriber management node determines multiple first parameters which are provided from one or more servers and indicate requirements for monitoring a same terminal device. The subscriber management node determines, based on the multiple first parameters, a second parameter which is to be applied to the same terminal device to satisfy the requirements indicated by the multiple first parameters.

12 Claims, 6 Drawing Sheets

(51) Int. Cl.
    *H04W 24/08*     (2009.01)
    *H04W 48/16*     (2009.01)
    *H04W 60/02*     (2009.01)

(56) References Cited

U.S. PATENT DOCUMENTS

| | | | | |
|---|---|---|---|---|
| 10,555,202 | B1* | 2/2020 | Narayanan | H04W 24/10 |
| 11,425,538 | B2* | 8/2022 | Zhu | H04L 41/069 |
| 12,028,931 | B2* | 7/2024 | Zhou | H04W 8/08 |
| 2016/0277243 | A1* | 9/2016 | Kim | H04L 41/0816 |
| 2016/0286385 | A1* | 9/2016 | Ryu | H04W 68/00 |
| 2016/0337841 | A1* | 11/2016 | Won | H04W 24/10 |
| 2018/0255474 | A1* | 9/2018 | Toth | H04W 24/00 |
| 2019/0273637 | A1* | 9/2019 | Zhang | H04L 5/0051 |
| 2021/0022101 | A1* | 1/2021 | Zhu | H04W 4/60 |
| 2021/0029517 | A1* | 1/2021 | Zhu | H04L 67/306 |
| 2021/0377721 | A1* | 12/2021 | Zhou | H04W 60/06 |
| 2022/0182860 | A1* | 6/2022 | Chatterjee | H04W 24/08 |
| 2022/0183049 | A1* | 6/2022 | Lee | H04W 72/569 |

FOREIGN PATENT DOCUMENTS

| | | |
|---|---|---|
| CN | 104144434 A | 11/2014 |
| JP | 2021517438 A | 7/2021 |
| WO | 2015065128 A1 | 5/2015 |
| WO | 2019192326 A1 | 10/2019 |

OTHER PUBLICATIONS

"Enhancement to Monitoring Event Configuration and Network Parameter Configuration", SA WG2 Meeting #133, Tdoc S2-1905078, Ericsson, Reno, Nevada, USA, May 13-17, 2019, 10 pages.

"Subscription cancellation for group member UE", 3GPP TSG-SA WG2 Meeting #133, S2-1905080, Ericsson, Convida, Reno, Nevada, USA, May 13-17, 2019, 8 pages.

3GPP, "3GPP TS 23.682 V16.2.0", 3rd Generation Partnership Project; Technical Specification Group Services and System Aspects; Architecture enhancements to facilitate communications with packet data networks and applications (Release 16), Mar. 2019, 1-126.

3GPP, "3GPP TS 29.122 V16.1.0", 3rd Generation Partnership Project; Technical Specification Group Core Network and Terminals; T8 reference point for Northbound APIs; (Release 16), Mar. 2019, 1-288.

3GPP, "3GPP TS 29.336 V15.6.0", 3rd Generation Partnership Project; Technical Specification Group Core Network and Terminals; Home Subscriber Server (HSS) diameter interfaces for interworking with packet data networks and applications (Release 15), Mar. 2019, 1-75.

Ericsson, "Enhancement of Monitoring Event configuration and Network Parameter Configuration", 3GPP TSG-SA2 Meeting #133, S2-1906370, (Rev of 5079), Reno, Nevada, USA, May 13-17, 2019, 1-9.

Ericsson, "Monitoring event cancellation due to TAU timer overwritten", 3GPP TSG-SA WG2 Meeting #132, 82-1903891, (Rev of S2-1903181), Xi'an, P.R. China, Apr. 8-12, 2019, 1-7.

"Enhancement of Monitoring Event Configuration", SA WG2 Meeting #130, S2-1900455 (Revision of S2-19xxxxx), Huawei, HiSilicon, AT&T, CAICT, CATT, China Telecom, Kochi, India, Jan. 21-25, 2019, 4 pages.

"Subscription cancellation for group member UE", 3GPP TSG-SA WG2 Meeting #131, S2-1901581, Ericsson, Convida, Santa Cruz, Tenerife, Spain, Feb. 25-Mar. 1, 2019, 9 pages.

* cited by examiner

METHODS AND APPARATUSES FOR CONFIGURATION OF MONITORING FOR TERMINAL DEVICE

TECHNICAL FIELD

Embodiments of the disclosure generally relate to communication, and, more particularly, to methods and apparatuses for configuration of monitoring for terminal device.

BACKGROUND

This section introduces aspects that may facilitate better understanding of the present disclosure. Accordingly, the statements of this section are to be read in this light and are not to be understood as admissions about what is in the prior art or what is not in the prior art.

Per 3rd generation partnership project (3GPP) technical specification (TS) 23.682 V16.2.0, "user equipment (UE) reachability" and "Loss of connectivity" are monitoring events. Specific parameters may be associated with each monitoring event. For example, parameter "Maximum Detection Time" may be provided by a service capability server/application server (SCS/AS) to a service capability exposure function (SCEF) for monitoring event (type) "Loss of connectivity". Parameters "Maximum Latency" and "Maximum Response Time" may be provided by the SCS/AS to the SCEF for monitoring event (type) "UE reachability".

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for configuration of monitoring for terminal device.

According to a first aspect of the disclosure, there is provided a method in a subscriber management node. The method may comprise determining multiple first parameters which are provided from one or more servers and indicate requirements for monitoring a same terminal device. The method may further comprise determining, based on the multiple first parameters, a second parameter which is to be applied to the same terminal device to satisfy the requirements indicated by the multiple first parameters.

In this way, a plurality of monitoring configurations from one or more servers can be allowed to coexist in the same terminal device.

In an embodiment of the disclosure, the multiple first parameters may be included in multiple requests from one server.

In an embodiment of the disclosure, the second parameter may indicate a value for periodic tracking area update (pTAU) timer or periodic registration timer.

In an embodiment of the disclosure, the multiple first parameters may comprise one or more of: a "Maximum Detection Time" parameter used for "Loss of connectivity" monitoring event; a "Maximum Latency" parameter used for "UE reachability" monitoring event; and a "Maximum Latency" parameter provided through network parameter configuration.

In an embodiment of the disclosure, the second parameter may be determined to have a lowest value among values of the multiple first parameters.

In an embodiment of the disclosure, the second parameter may indicate a value for active time within which the same terminal device is available for a mobile terminating service.

In an embodiment of the disclosure, the multiple first parameters may comprise one or more of: a "Maximum Response Time" parameter used for "UE reachability" monitoring event; and a "Maximum Response Time" parameter provided through network parameter configuration.

In an embodiment of the disclosure, the second parameter may be determined to have a highest value among values of the multiple first parameters.

In an embodiment of the disclosure, the method may further comprise providing a value of the second parameter to at least one of the one or more servers via a network exposure node.

In an embodiment of the disclosure, a number of the one or more servers may be more than one. When the second parameter is determined to correspond to one of the multiple first parameters which is currently requested to be configured from a first server of the more than one servers, the value of the second parameter may be provided to remaining server(s) of the more than one servers. When the second parameter is determined not to correspond to one of the multiple first parameters which is currently requested to be configured from the first server, the value of the second parameter may be provided to the first server.

In an embodiment of the disclosure, the same terminal device may be a member of a group of terminal devices. The value of the second parameter may be provided in a message which is used for the group of terminal devices and comprises identification information of the terminal device.

In an embodiment of the disclosure, the second parameter may be determined for one or more additional terminal devices in the group of terminal devices. The message may further comprise identification information of the one or more additional terminal devices.

In an embodiment of the disclosure, the value of the second parameter may be provided in one or more of: a Monitoring Response message; a Monitoring indication message; a T8 Set Suggested Network Configuration Response message; and a T8 Set Suggested Network Configuration Indication message.

In an embodiment of the disclosure, the subscriber management node may be a home subscriber server (HSS) or a unified data management (UDM).

In an embodiment of the disclosure, the network exposure node may be a service capability exposure function (SCEF) or a network exposure function (NEF).

According to a second aspect of the disclosure, there is provided a method in a subscriber management node. The method may comprise determining whether a monitoring event previously configured for a server needs to be cancelled. The method may further comprise, when determining that the monitoring event needs to be cancelled, sending a request for cancellation of the monitoring event to a network exposure node. The request may comprise a reason of the cancellation.

In this way, the server may be prevented from subscribing to the monitoring event again and again leading to an endless loop.

In an embodiment of the disclosure, the request for cancellation may be a Monitoring Response message or a Monitoring indication message.

In an embodiment of the disclosure, the reason of cancellation may be carried in an information element.

According to a third aspect of the disclosure, there is provided a method in a subscriber management node. The subscriber management node may comprise at least one processor and at least one memory. The at least one memory may contain instructions executable by the at least one processor, whereby the subscriber management node may be operative to determine multiple first parameters which are provided from one or more servers and indicate requirements for monitoring a same terminal device. The subscriber management node may be further operative to determine, based on the multiple first parameters, a second parameter which is to be applied to the same terminal device to satisfy the requirements indicated by the multiple first parameters.

In an embodiment of the disclosure, the subscriber management node may be operative to perform the method according to the above first aspect.

According to a fourth aspect of the disclosure, there is provided a subscriber management node. The subscriber management node may comprise at least one processor and at least one memory. The at least one memory may contain instructions executable by the at least one processor, whereby the subscriber management node may be operative to determine whether a monitoring event previously configured for a server needs to be cancelled. The subscriber management node may be further operative to, when determining that the monitoring event needs to be cancelled, send a request for cancellation of the monitoring event to a network exposure node. The request may comprise a reason of the cancellation.

In an embodiment of the disclosure, the subscriber management node may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a subscriber management node. The subscriber management node may comprise a first determination module for determining multiple first parameters which are provided from one or more servers and indicate requirements for monitoring a same terminal device. The subscriber management node may further comprise a second determination module for determining, based on the multiple first parameters, a second parameter which is to be applied to the same terminal device to satisfy the requirements indicated by the multiple first parameters.

According to an eighth aspect of the disclosure, there is provided a subscriber management node. The subscriber management node may comprise a determination module for determining whether a monitoring event previously configured for a server needs to be cancelled. The subscriber management node may further comprise a sending module for, when determining that the monitoring event needs to be cancelled, sending a request for cancellation of the monitoring event to a network exposure node. The request may comprise a reason of the cancellation.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
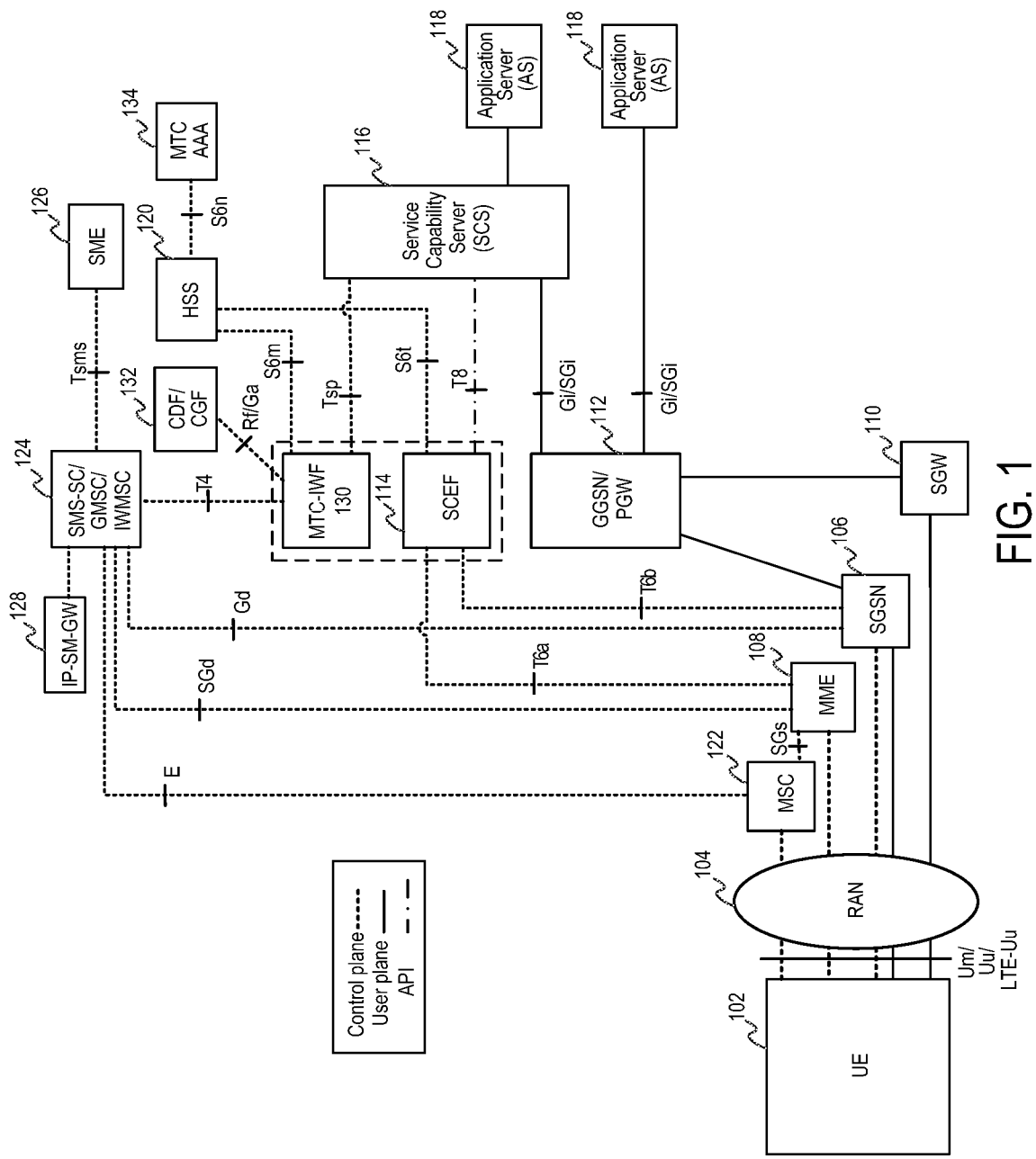
FIG. 1 is a diagram showing an exemplary communication system into which an embodiment of the disclosure is applicable.

For the purpose of explanation, details are set forth in the following description in order to provide a thorough understanding of the embodiments disclosed. It is apparent, however, to those skilled in the art that the embodiments may be implemented without these specific details or with an equivalent arrangement.

Per 3GPP TS 23.682 V16.2.0, there are different input parameters that can be used to determine the subscribed periodic tracking area update (TAU) Timer. The first input parameter (Input-1) is Maximum Detection Time for monitoring event type "Loss of Connectivity". The second input parameter (Input-2) is Maximum Latency for monitoring event type "UE Reachability". The third input parameter (Input-3) is Maximum Latency in Network Parameter Configuration.

Clause 5.6.1.1 of 3GPP TS 23.682 V16.2.0 may be used to configure the parameters in Input-1 and Input-2. For Input-1, clause 5.6.1.3 of 3GPP TS 23.682 V16.2.0 provides specific explanation for the flowchart of clause 5.6.1.1. In particular, the following explanation is provided:

4. The HSS executes step 4 of clause 5.6.1.1. In addition, it checks whether the Maximum Detection Time is within the range defined by operator policies, and, if acceptable then the HSS sets the subscribed periodic RAU/TAU timer using the value of Maximum Detection Time, if it is provided. If the Maximum Detection Time is not acceptable, the HSS rejects the request by executing step 8, and provides a Cause value indicating the reason for the failure condition to the SCEF. If the subscribed periodic RAU/TAU Timer was previously set by a different Monitoring Request identified by a different SCEF Reference ID for the same UE then, depending on operator configuration, the HSS either performs step 8 to reject the Monitoring Request with an appropriate Cause or accepts the request. In case the HSS accepts this request, then it cancels the previously accepted Monitoring Request by including the SCEF Reference ID of that Monitoring Request in step 8.

For Input-2, clause 5.6.1.4 of 3GPP TS 23.682 V16.2.0 provides specific explanation for the flowchart of clause 5.6.1.1. In particular, the following explanation is provided:

Optionally, Maximum Latency indicating maximum delay acceptable for downlink data transfers. Maximum Latency is used for setting the periodic TAU/RAU timer for the UE as it sets the maximum period after which a UE has to connect to the network again and thereby becomes reachable. Determined by the operator, low values for Maximum Latency may deactivate PSM.

Optionally, Maximum Response Time indicating the time for which the UE stays reachable to allow the SCS/AS to reliably deliver the required downlink data. Maximum Response Time is used for setting the Active Time for the UE. When the UE uses extended idle mode DRX, the Maximum Response Time is used to determine how early this monitoring event should be reported to the SCS/AS before the next Paging Occasion occurs.

1. the SCS/AS sets Monitoring Type to "UE Reachability", and includes Reachability Type, and any combination of the following optional parameters: Maximum Latency, Maximum Response Time, Suggested number of downlink packets, and Idle Status Indication prior to sending the Monitoring Request to the SCEF as in step 1 of clause 5.6.1.1.

2. The SCEF executes step 2 of clause 5.6.1.1. In addition, it checks whether the Maximum Latency (if included), the Maximum Response Time (if included), and the Suggested number of downlink packets (if included) are within the range defined by operator policies. If not, or if the network does not support Idle Status Indication, then depending on operator policies, the SCEF rejects the request by performing step 9 of 5.6.1.1 with an appropriate cause value.

4. The HSS executes step 4 of clause 5.6.1.1. In addition, it checks whether the Maximum Latency, if provided, is within the range defined by operator policies, and if acceptable, the HSS sets the subscribed periodic RAU/TAU timer using the value of Maximum Latency, if it is provided. If the requested timer value is not acceptable, the HSS rejects the request by executing step 8, and provides a Cause value indicating the reason for the failure condition to the SCEF. In addition, the HSS checks whether the Suggested number of downlink packets is within the range defined by operator policies. If it is not, then the HSS rejects the request by executing step 8, and provides a Cause value indicating the reason for failure condition to the SCEF. If the subscribed periodic RAU/TAU timer was previously set by a different Monitoring Request identified by a different SCEF Reference ID for the same UE then, depending on operator configuration, the HSS either performs step 8 to reject the Monitoring Request with an appropriate Cause or accepts the request. In the case that the HSS accepts this request, then it cancels the previously accepted Monitoring Request by including the SCEF Reference ID of that Monitoring Request in step 8. If the HSS supports Idle Status Indication, then it includes it in step 5.

Clause 5.18 of 3GPP TS 23.682 V16.2.0 may be used to configure the network parameters in Input-3. In particular, the following description is provided in clause 5.18:

3. The SCEF sends a Set Suggested Network Configuration Request (External Identifier or MSISDN or External Group Identifier, SCEF ID, SCEF Reference ID, Maximum Latency (if provided), Maximum Response Time (if provided), Suggested Number of Downlink Packets (if provided), Group Reporting Guard Time, SCEF Reference ID for Deletion) message to the HSS to configure the parameters on the HSS and on the MME/SGSN. If the External Group Identifier is included, External Identifier or MSISDN shall be ignored.

4. The HSS examines the Set Suggested Network Configuration Request message, e.g. with regard to the existence of External Identifier or MSISDN or External Group Identifier or whether the included parameters are in the range acceptable for the operator, if this check fails the HSS either skips steps 5-9 and provides a Cause value indicating the reason for the failure condition to the SCEF or selects different value(s) that are in range and proceeds with flow. If the HSS decides on using values, for the parameters provided in step 3, different to the ones provided by the SCEF, then the SCEF is informed of it in step 10. In addition, the HSS sets the subscribed periodic RAU/TAU timer using the value of Maximum Latency, if it is provided. If the subscribed periodic RAU/TAU timer was previously set by a Monitoring Request then, depending on operator configuration, the flow skips steps 5-9 and the HSS rejects the Network Configuration Request with an appropriate Cause indicating the failure condition or accepts the request. In the case that the HSS accepts this request, the HSS cancels the previously accepted Monitoring Request. If SCEF Reference ID for Deletion was provided, the HSS deletes the network parameter configuration identified by the SCEF Reference ID for Deletion.

Subscribed Active Time is determined using the following two input parameters. The first input parameter (Input-1) is Maximum Response Time for monitoring event type "UE Reachability". The second input parameter (Input-2) is Maximum Response Time in Network Parameter Configuration. For Input-1, the description about how Maximum Response Time is configured has been provided above with respect to Input-2 for determining subscribed periodic TAU Timer. For Input-2, the description about how Maximum Response Time is configured has been provided above with respect to Input-3 for determining subscribed periodic TAU Timer.

In addition, per section 5.6.9 of 3GPP TS 23.682 V16.2.0, the HSS can trigger cancellation of a monitoring event. In particular, the following description is provided in section 5.6.9:

1. Due to certain conditions (e.g. for a single UE processing, a previously set subscribed periodic RAU/TAU Timer from one SCS/AS is being overwritten by another SCS/AS, or for group based processing, if a given External Group ID for which a previous group request was accepted is now no longer valid) HSS triggers a Monitoring Response message or Monitoring Indication message towards the SCEF and includes SCEF Reference ID of a previously accepted Monitoring Event which needs cancellation.

In view of the above, there are following problems with the current technical specification. First, when multiple configurations of the same event type, and/or multiple configurations from different event types, and/or multiple network parameter configurations are provided to the HSS, it is not specified how the HSS decides what value should be set to periodic TAU timer. Second, when multiple configurations of the same event type, and/or multiple configurations from different event types, and/or multiple network parameter configurations are provided to the HSS, it is not specified how the HSS decides on what value should be set to Active Time. Third, when a monitoring event is to be cancelled, there is no reason of the cancellation from the HSS to the SCEF (and then to the SCS/AS), and consequently the SCS/AS may subscribe to the event again and again leading to an endless loop.

The present disclosure proposes an improved solution for configuration of monitoring for terminal device. Hereinafter, the solution will be described in detail with reference to FIGS. 1-11.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future.

In the following, different terms may refer to a same or similar network function or network node with the same or similar functionality in different communication systems. Thus, the specific terms used herein do not limit the present disclosure only to the communication system related to the specific terms, which however can be more generally applied to other communication systems. In addition, the network function or network node described herein may be implemented either as a network element on a dedicated hardware, as a software instance running on a dedicated hardware, or as a virtualized function instantiated on an appropriate platform, e.g. on a cloud infrastructure.

FIG. 1 is a diagram showing an exemplary communication system into which an embodiment of the disclosure is applicable. As shown, the communication system comprises a user equipment (UE) 102, a radio access network (RAN) 104, a serving general packet radio service (GPRS) support node (SGSN) 106, a mobility management entity (MME) 108, a serving gateway (SGW) 110, a gateway GPRS support node (GGSN)/packet data network (PDN) gateway (PGW) 112, a service capability exposure function (SCEF) 114, a service capability server (SCS) 116, an application server (AS) 118 and a home subscriber server (HSS) 120. Note that the number of each entity mentioned above may be more than one.

The UE 102 can communicate through a radio access communication link with the RAN 104. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 104 may include, for example, a universal mobile telecommunications system (UMTS) terrestrial RAN (UTRAN), a global system for mobile communication (GSM) enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs or eNBs) that can provide the combined functionality of the RNC nodes and base stations of the UTRAN and the GERAN.

The SGSN 106 is a core network node in the UMTS and has a user-plane function and a control-plane function. The user-plane function of the SGSN 106 can transfer user data packets of the UE 102 between the RAN 104 and the GGSN/PGW 112. The control-plane function of the SGSN 106 can carry out mobility management of the UE 102, bearer management and the like. The MME 108 is a core network node in evolved packet system (EPS) and can carry out the mobility management of the UE 102, the bearer management, and the like. The SGW 110 is a packet transfer node in the core network of the EPS. The SGW 110 can transfer user data packets of the UE 102 between the RAN 104 and the GGSN/PGW 112.

The GGSN is a core network node in the UMTS. The PGW is a core network node in the EPS. The GGSN/PGW 112 means either the GGSN or the PGW or both. The GGSN/PGW 112 is a user-plane packet transfer node in the core network and can transfer user data packets of the UE 102. The GGSN/PGW 112 can serve as a gateway to an external PDN and provide the UE 102 with the connectivity to the external PDN.

The SCEF 114 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The SCS 116 can make open service access (OSA) standard interfaces accessible by application and provide an abstraction of network protocol for application developers. As a gateway between applications and the network, the SCS 120 can accomplish mapping of OSA interfaces onto network protocols and vice versa. The AS 118 may be a type of server designed to install, operate and host applications and associated services for users. The HSS 120 is a control-plane node in the core network of 3GPP public land mobile network (PLMN) and can manage subscriber information of the UE 102.

As shown in FIG. 1, the communication system may further comprise a mobile switching center (MSC) 122, a short message service (SMS)-service center (SC)/gateway mobile switching center (GMSC)/interworking MSC (IWMSC) 124, a short message entity (SME) 126, an IP-short message (SM)-gateway (GW) 128, a machine-type communication (MTC)-interworking function (IWF) 130, a charge data function (CDF)/charge gateway function (CGF) 132 and an MTC-authentication, authorization and accounting (AAA) 134. It should be noted that the SCEF 114 and the HSS 120 are merely exemplary examples of the components in the communication system and may be replaced by components with similar functionalities. For example, in 5G core (5GC), the SCEF may be replaced by a network exposure function (NEF) and the HSS may be replaced by a unified data management (UDM).

Figure 2:
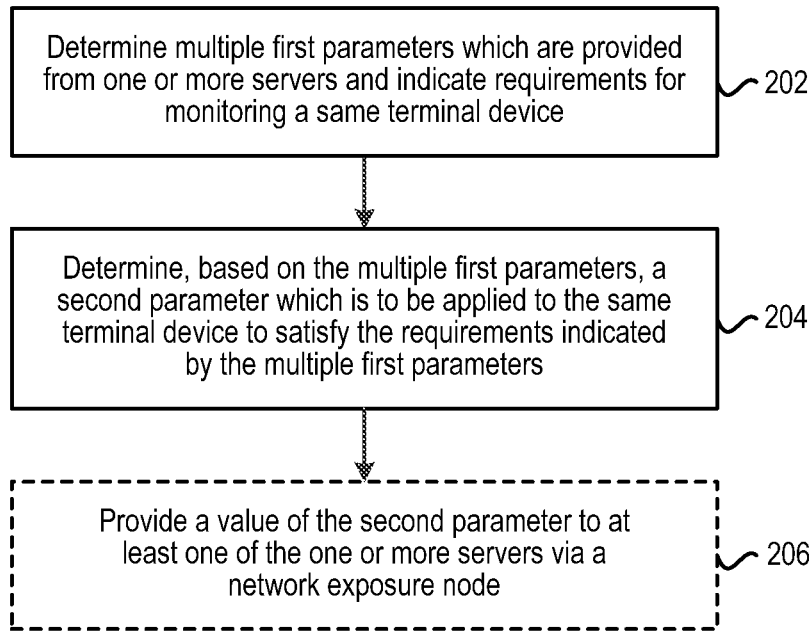
FIG. 2 is a flowchart illustrating a method implemented at a subscriber management node according to an embodiment of the disclosure.

FIG. 2 is a flowchart illustrating a method implemented at a subscriber management node according to an embodiment of the disclosure. The subscriber management node may be an HSS, a UDM, or any other entity having similar functionality. At block 202, the subscriber management node determines multiple first parameters which are provided from one or more servers and indicate requirements for monitoring a same terminal device. For example, the server may be an SCS or an AS. The multiple first parameters may be provided through monitoring event configuration and/or network parameter configuration. In the case of monitoring event configuration, any two of the multiple first parameters may be used for the same monitoring event type and provided from different servers, or may be used for different monitoring event types and provided from the same server or different servers. This means the multiple first parameters may be provided from multiple servers or from one server.

As a first type, the first parameter may be a "Maximum Detection Time" parameter used for "Loss of connectivity" monitoring event. As a second type, the first parameter may be a "Maximum Latency" parameter used for "UE reachability" monitoring event. As a third type, the first parameter may be a "Maximum Latency" parameter provided through network parameter configuration. As a fourth type, the first parameter may be a "Maximum Response Time" parameter used for "UE reachability" monitoring event. As a fifth type, the first parameter may be a "Maximum Response Time" parameter provided through network parameter configuration. Block 302 may be performed in response to receiving a first parameter from a server in a configuration request (e.g. a Monitoring Request, a Set Suggested Network Configuration request). The determined multiple first parameters may include this first parameter currently received and other related first parameter(s) received previously.

Figure 3:
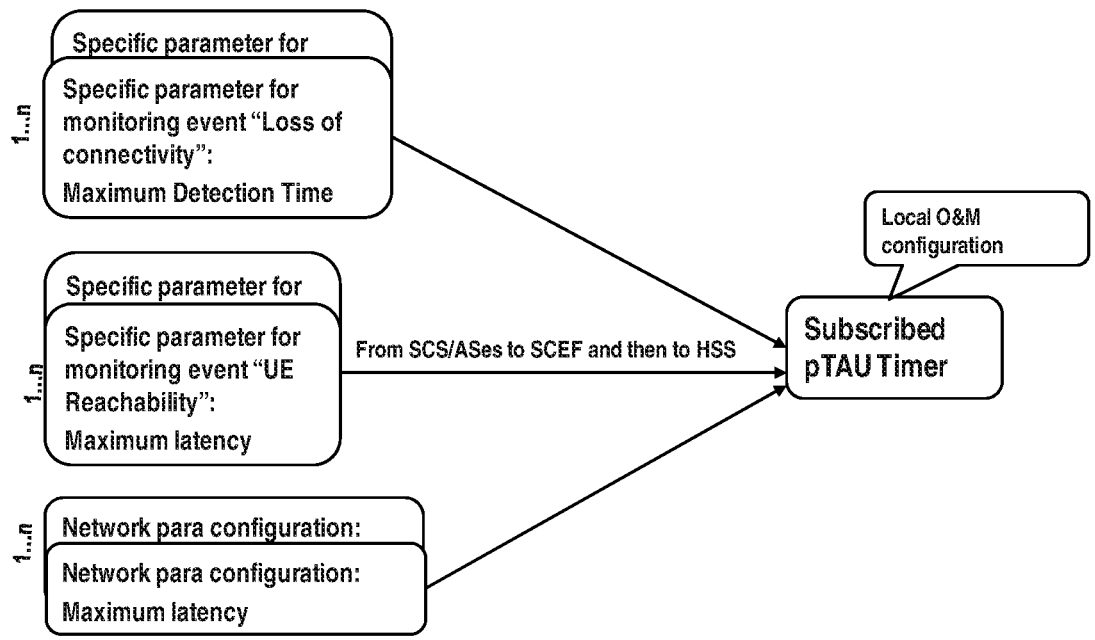
FIG. 3 is a diagram illustrating an exemplary example of the disclosure.

At block 204, the subscriber management node determines, based on the multiple first parameters, a second parameter which is to be applied to the same terminal device to satisfy the requirements indicated by the multiple first parameters. In this way, a plurality of monitoring configurations from one or more servers can be allowed to coexist in the same terminal device. As an example, the second parameter may indicate a value for periodic TAU (pTAU) timer (or periodic registration timer). In this case, multiple first parameters belonging to one or more of the above first to third types may be used to determine the second parameter. As an exemplary example, the second parameter may be determined to have a lowest value among values of the multiple first parameters. For instance, as shown in FIG. 3, for each of the above first to third types, there may be corresponding first parameters provided from multiple servers. When these multiple input parameters are used in selecting subscribed pTAU timer, the lowest value from the different input parameters is used to set the pTAU Timer.

Figure 4:
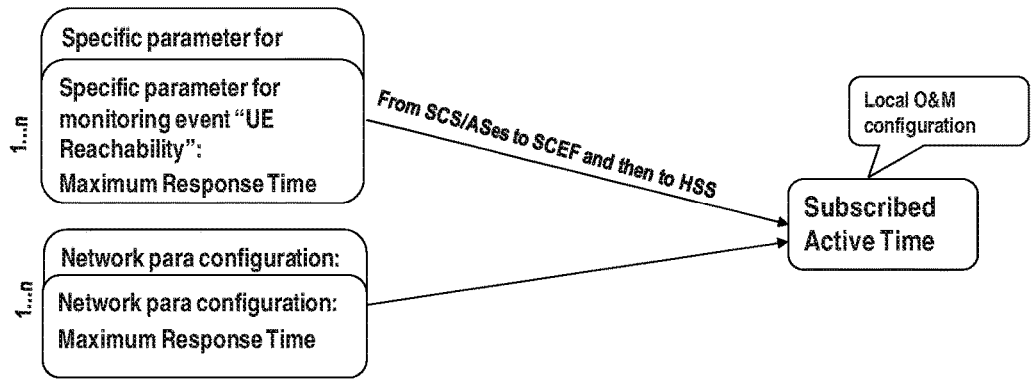
FIG. 4 is a diagram illustrating an exemplary example of the disclosure.

As another example, the second parameter may indicate a value for active time within which the same terminal device is available for a mobile terminating service. In this case, multiple first parameters belonging to one or more of the above fourth and fifth types may be used to determine the second parameter. As an exemplary example, the second parameter may be determined to have a highest value among values of the multiple first parameters. For instance, as shown in FIG. 4, for each of the above fourth and fifth types, there may be corresponding first parameters provided from multiple servers. When these multiple input parameters are used in selecting subscribed Active Time, the highest value from the different input parameters is used to set the Active Time.

Optionally, at block 206, the subscriber management node provides a value of the second parameter to at least one of the one or more servers via a network exposure node. The network exposure node may be an SCEF, an NEF, or any other entity having similar functionality. The value of the second parameter may be provided in monitoring event configuration procedure and/or network parameter configuration procedure. As an exemplary example, the value of the second parameter may be provided in one or more of a Monitoring Response message, a Monitoring indication message, a T8 Set Suggested Network Configuration Response message, and a T8 Set Suggested Network Configuration Indication message.

In a case that the number of the one or more servers is one, it is possible that there are two different first parameters, one of which is provided currently by a server for a first monitoring event type and the other of which is provided previously by the same server for a second monitoring event type. If the second parameter is determined to correspond to the first parameter provided currently, the value of the second parameter may be provided to an application on the server responsible for the second monitoring event type. On the other hand, if the second parameter is determined not to correspond to the first parameter provided currently, the value of the second parameter may be provided to an application on the server responsible for the first monitoring event type.

Similarly, in a case that the number of the one or more servers is more than one, if the second parameter is determined to correspond to one of the multiple first parameters which is currently requested to be configured from a first server of the more than one servers, the value of the second parameter may be provided to remaining server(s) of the more than one servers. On the other hand, if the second parameter is determined not to correspond to one of the multiple first parameters which is currently requested to be configured from the first server, the value of the second parameter may be provided to the first server.

Optionally, the same terminal device may be a member of a group of terminal devices. In this case, the subscriber management node may determine whether the second parameter has also been determined for the other member(s) of the group. If the second parameter has not been determined for any of the other member(s) of the group, the value of the second parameter may be provided in a message which is used for the group of terminal devices and comprises identification information (e.g. MSISDN or external identifier) of the terminal device. The term MSISDN refers to mobile subscriber international integrated services digital network (ISDN) number. On the other hand, if the second parameter has been determined for one or more additional terminal devices in the group, the message may further comprise identification information of the one or more additional terminal devices.

Figure 5:
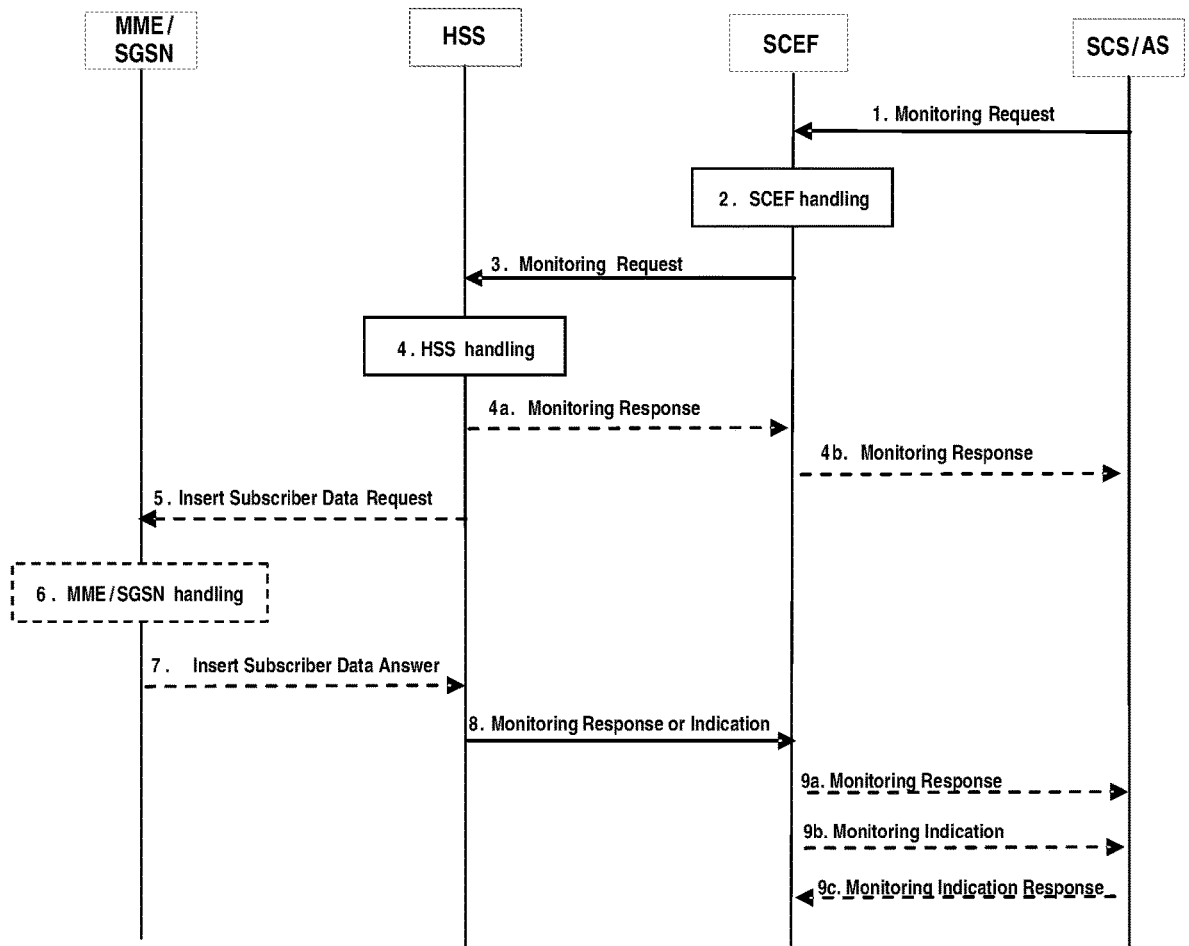
FIG. 5 is a flowchart illustrating an exemplary process into which an embodiment of the disclosure is applicable.

FIG. 5 is a flowchart illustrating an exemplary process into which an embodiment of the disclosure is applicable. FIG. 5 is Figure 5.6.1.1-1 of TS 23.682 and its related description is incorporated herein by reference in its entirety. As shown, this process involves four entities, i.e. an MME/SGSN, an HSS, an SCEF and an SCS/AS. In this embodiment, when the HSS decides to set pTAU timer or Active Time to a value that is different from the requested value from some SCS/ASes, the HSS may notify the SCEF which then notifies the SCS/ASes what value is being applied in the 3GPP network. Thus, the proposed updates to TS 23.682 may be as follows:

In step 4a and 4b, Monitor Response may contain the value that is applied.

If later on, HSS re-calculates the subscribed pTAU timers or subscribed Active Time, the HSS notifies the SCEF and then to SCS/AS of the value that is applied in 3GPP network in a separate Monitoring Indication message. Notification message may include one or more of the UE identities.

Figure 6:
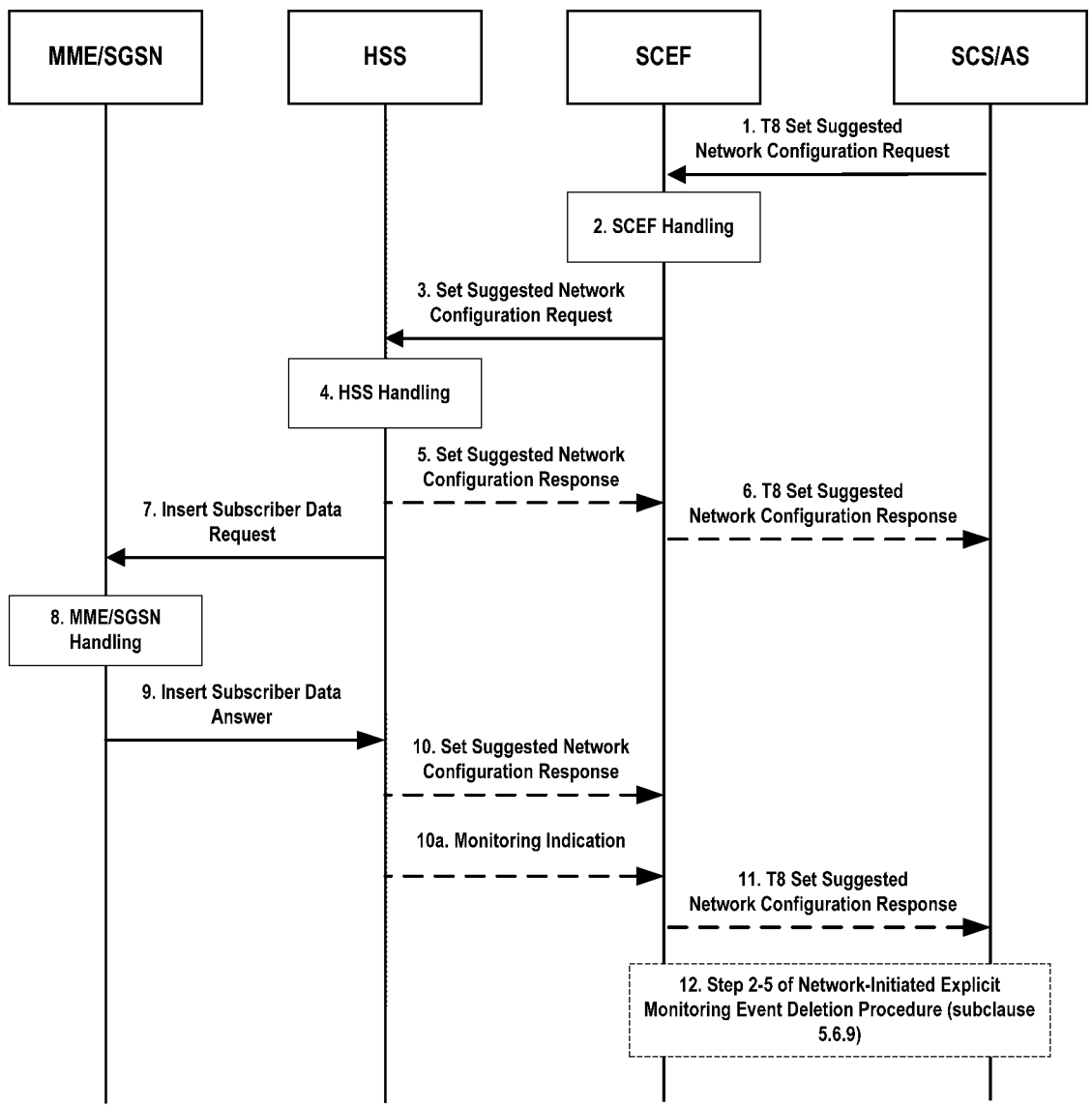
FIG. 6 is a flowchart illustrating another exemplary process into which an embodiment of the disclosure is applicable.

FIG. 6 is a flowchart illustrating another exemplary process into which an embodiment of the disclosure is applicable. FIG. 6 is Figure 5.18-1 of TS 23.682 and its related description is incorporated herein by reference in its entirety. In this embodiment, when the HSS decides to set pTAU timer or Active Time to a value that is different from the requested value from some SCS/ASes, the HSS may notify the SCEF which then notifies the SCS/ASes what value is being applied in the 3GPP network. Thus, the proposed updates to TS 23.682 may be as follows:

In step 5 and 6, T8 Set Suggested Network Configuration Response may contain the value that is applied.

If later on, HSS re-calculates the subscribed pTAU timers or subscribed Active Time, the HSS notifies the SCEF and then to SCS/AS of the value that is applied in 3GPP network in a separate T8 Set Suggested Network Configuration Indication message. Notification message may include one or more of the UE identities.

Figure 7:
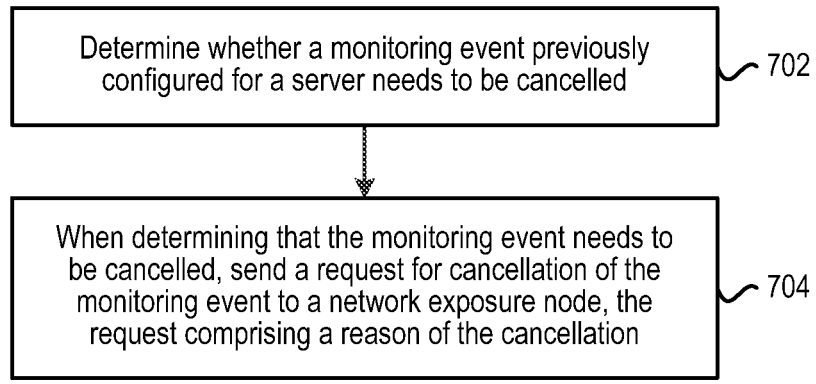
FIG. 7 is a flowchart illustrating a method implemented at a subscriber management node according to another embodiment of the disclosure.

FIG. 7 is a flowchart illustrating a method implemented at a subscriber management node according to another embodiment of the disclosure. At block 702, the subscriber management node determines whether a monitoring event previously configured for a server needs to be cancelled. If it is determined at block 702 that the monitoring event needs to be cancelled, the subscriber management node sends a request for cancellation of the monitoring event to a network exposure node at block 704. The request comprises a reason of the cancellation (e.g. incompatible configuration). In this way, the server may be prevented from subscribing to the monitoring event again and again leading to an endless loop. As an exemplary example, the request for cancellation may be a Monitoring Response message or a Monitoring indication message. The reason of cancellation may be carried in an information element. It should be noted that two blocks shown in succession in the figures may, in fact, be executed substantially concurrently, or the blocks may sometimes be executed in the reverse order, depending upon the functionality involved.

Figure 8:
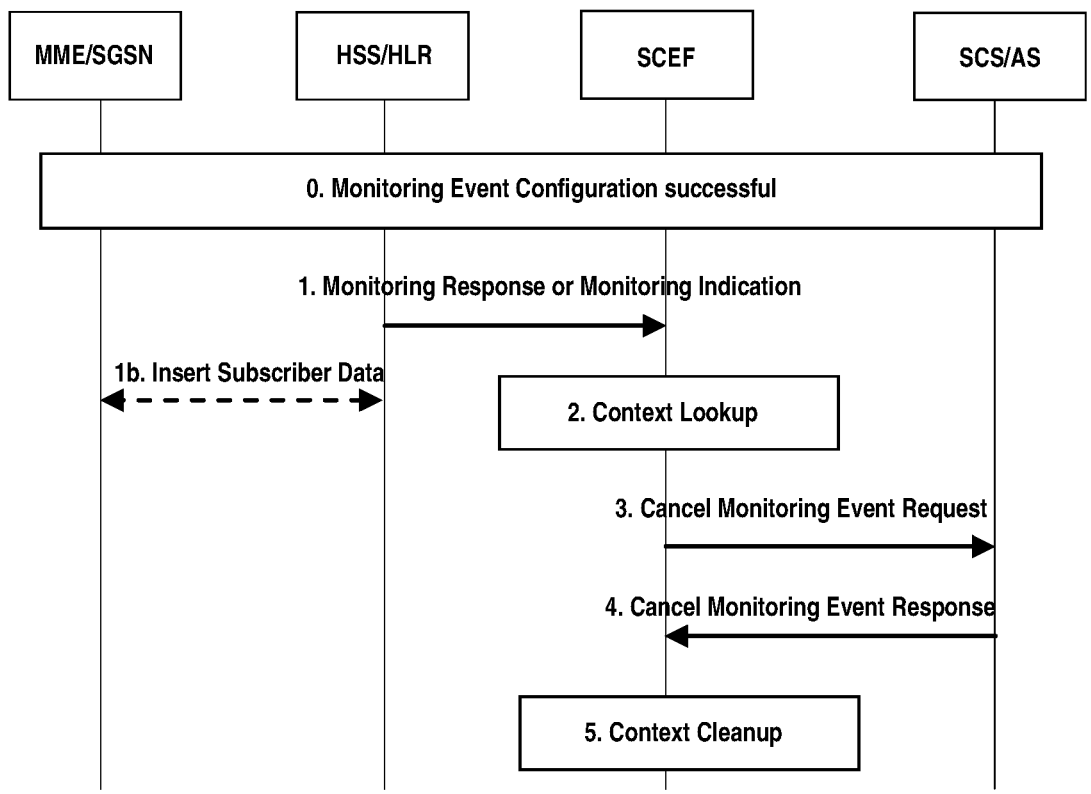
FIG. 8 is a flowchart illustrating an exemplary process into which an embodiment of the disclosure is applicable.

FIG. 8 is a flowchart illustrating another exemplary process into which an embodiment of the disclosure is applicable. FIG. 8 is Figure 6.5.9-1 of TS 23.682 and its related description is incorporated herein by reference in its entirety. In this embodiment, when a monitoring event is to be cancelled, the reason of the cancellation is provided from the HSS to the SCEF (and then to the SCS/AS). Thus, the updated description for Figure 6.5.9-1 of TS 23.682 may be shown as follows with the update being underlined:

5.6.9 Network-initiated Explicit Monitoring Event Deletion Procedure

The procedure is used by the SCEF towards the SCS/AS to delete a previously configured Monitoring Event.

0. A Monitoring Event configuration procedure according to clause 5.6.1 or clause 5.6.6 has already executed successfully.

1. Due to certain conditions (e.g. for a single UE processing, a previously set subscribed periodic RAU/TAU Timer from one SCS/AS is being overwritten by another SCS/AS, or for group based processing, if a given External Group ID for which a previous group request was accepted is now no longer valid) HSS triggers a Monitoring Response message or Monitoring Indication message towards the SCEF and includes SCEF Reference ID of a previously accepted Monitoring Event which needs cancellation, and the HSS may also include a reason of cancellation.

1b. The HSS also deletes the previously configured Monitoring Event in the MME/SGSN, if applicable, e.g. at deletion of an External Group ID in the HSS.

2. Based on the SCEF Reference ID for cancellation included in step 1a or local context lookup in step 1b, the SCEF determines TLTRI of the configured Monitoring Event which needs cancellation.

3. The SCEF sends a Cancel Monitoring Event Request (TLTRI, Cause) message to the T8 Destination Address. Cause value indicates the reason for cancellation of the previously configured Monitoring Event.

4. The SCS/AS sends a Cancel Monitoring Event Response (Cause) message to the SCEF. The SCS/AS deletes T8 context associated with the TLTRI received in step 3. Cause indicates the result of the procedure.

5. The SCEF deletes T8 context and the SCEF EPS Bearer context associated with the TLTRI sent in step 3.

Figure 9:
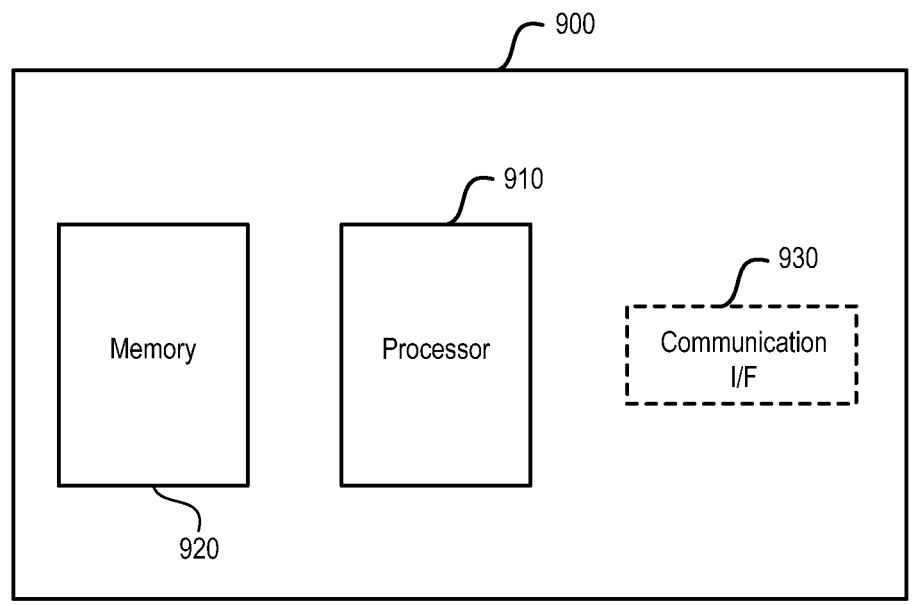
FIG. 9 is a block diagram showing an apparatus suitable for use in practicing some embodiments of the disclosure.

FIG. 9 is a block diagram showing an apparatus suitable for use in practicing some embodiments of the disclosure. For example, the subscriber management node described above may be implemented through the apparatus 900. As shown, the apparatus 900 may include a processor 910, a memory 920 that stores a program, and optionally a communication interface 930 for communicating data with other external devices through wired and/or wireless communication.

The program includes program instructions that, when executed by the processor 910, enable the apparatus 900 to operate in accordance with the embodiments of the present disclosure, as discussed above. That is, the embodiments of the present disclosure may be implemented at least in part by computer software executable by the processor 910, or by hardware, or by a combination of software and hardware.

The memory 920 may be of any type suitable to the local technical environment and may be implemented using any suitable data storage technology, such as semiconductor based memory devices, flash memories, magnetic memory devices and systems, optical memory devices and systems, fixed memories and removable memories. The processor 910 may be of any type suitable to the local technical environment, and may include one or more of general purpose computers, special purpose computers, microprocessors, digital signal processors (DSPs) and processors based on multi-core processor architectures, as non-limiting examples.

Figure 10:
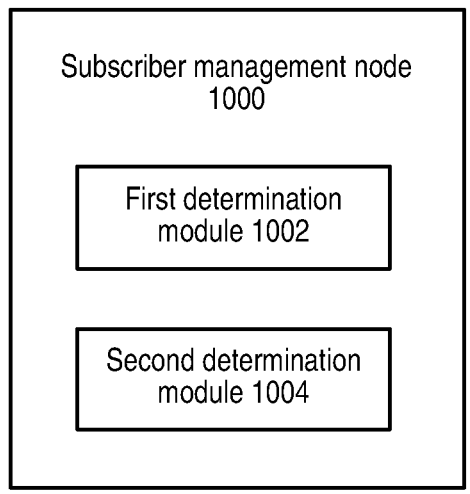
FIG. 10 is a block diagram showing a subscriber management node according to an embodiment of the disclosure.

FIG. 10 is a block diagram showing a subscriber management node according to an embodiment of the disclosure. As shown, the subscriber management node 1000 comprises a first determination module 1002 and a second determination module 1004. The first determination module 1002 may be configured to determine multiple first parameters which are provided from one or more servers and indicate requirements for monitoring a same terminal device, as described above with respect to block 202. The second determination module 1004 may be configured to determine, based on the multiple first parameters, a second parameter which is to be applied to the same terminal device to satisfy the requirements indicated by the multiple first parameters, as described above with respect to block 204.

Figure 11:
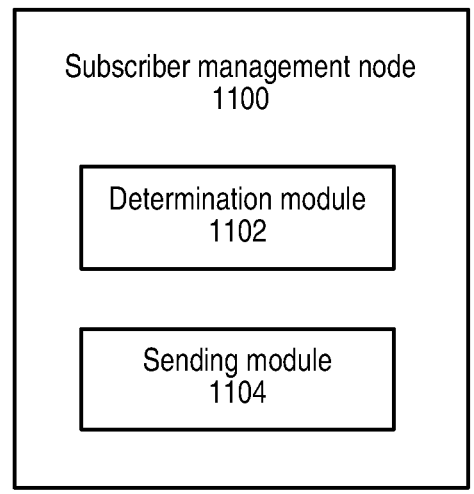
FIG. 11 is a block diagram showing a subscriber management node according to another embodiment of the disclosure.

FIG. 11 is a block diagram showing a subscriber management node according to another embodiment of the disclosure. As shown, the subscriber management node 1100 comprises a determination module 1102 and a sending module 1104. The determination module 1102 may be configured to determine whether a monitoring event previously configured for a server needs to be cancelled, as described above with respect to block 702. The sending module 1104 may be configured to, when determining that the monitoring event needs to be cancelled, send a request for cancellation of the monitoring event to a network exposure node, as described above with respect to block 704. The request comprises a reason of the cancellation. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a subscriber management node comprising:
   determining multiple first parameters which are provided from one or more servers and indicate requirements for monitoring a same terminal device;
   determining, based on the multiple first parameters, a second parameter which is to be applied to the same terminal device to satisfy the requirements indicated by the multiple first parameters; and providing a value of the second parameter to at least one of the one or more servers via a network exposure node;

wherein the second parameter indicates a value for a periodic tracking area update (pTAU) timer or a periodic registration timer, and the second parameter is set using a lowest value from the multiple first parameters, or wherein the second parameter indicates a value for an active time within which the same terminal device is available for a mobile terminating service and the second parameter is set using a highest value from the multiple first parameters.

2. The method according to claim 1, wherein the multiple first parameters are included in multiple requests from one server.

3. The method according to claim 1, wherein the multiple first parameters comprise one or more of:
 a "Maximum Detection Time" parameter used for a "Loss of connectivity" monitoring event;
 a "Maximum Latency" parameter used for a "UE reachability" monitoring event; and
 a "Maximum Latency" parameter provided through network parameter configuration.

4. The method according to claim 1, wherein the multiple first parameters comprise one or more of a "Maximum Response Time" parameter used for a "UE reachability" monitoring event, and a "Maximum Response Time" parameter provided through network parameter configuration.

5. The method according to claim 1, wherein a number of the one or more servers is more than one.

6. The method according to claim 1, wherein the same terminal device is a member of a group of terminal devices; and
 wherein the value of the second parameter is provided in a message which is used for the group of terminal devices and comprises identification information of the terminal device.

7. The method according to claim 6, wherein the second parameter is determined for one or more additional terminal devices in the group of terminal devices; and
 wherein the message further comprises identification information of the one or more additional terminal devices.

8. The method according to claim 1, wherein the value of the second parameter is provided in one or more of:
 a Monitoring Response message;
 a Monitoring indication message;
 a T8 Set Suggested Network Configuration Response message; and
 a T8 Set Suggested Network Configuration Indication message.

9. The method according to claim 1, wherein the subscriber management node is a home subscriber server (HSS) or a unified data management (UDM).

10. The method according to claim 1, wherein the network exposure node is a service capability exposure function (SCEF), or a network exposure function (NEF).

11. A subscriber management node comprising:
 at least one processor; and
 at least one memory, the at least one memory storing instructions which when executed by the at least one processor, causes the subscriber management node to:
 determine multiple first parameters which are provided from one or more servers and indicate requirements for monitoring a same terminal device; and
 determine, based on the multiple first parameters, a second parameter which is to be applied to the same terminal device to satisfy the requirements indicated by the multiple first parameters; and
 provide a value of the second parameter to at least one of the one or more servers via a network exposure node;
 wherein the second parameter indicates a value for a periodic tracking area update (pTAU) timer or a periodic registration timer, and the second parameter is set using a lowest value from the multiple first parameters, or wherein the second parameter indicates a value for an active time within which the same terminal device is available for a mobile terminating service and the second parameter is set using a highest value from the multiple first parameters.

12. The subscriber management node according to claim 11, wherein the multiple first parameters are included in multiple requests from one server.

* * * * *